(12) United States Patent
Nie et al.

(10) Patent No.: US 11,014,773 B2
(45) Date of Patent: May 25, 2021

(54) DEVICE AND METHOD FOR DETECTING DISTANCE FROM BALLOON TO INGOT TANK

(71) Applicant: YICHANG JINGWEI TEXTILE MACHINERY CO., LTD., Yichang (CN)

(72) Inventors: Jian Nie, Yichang (CN); Pihua Zhang, Yichang (CN); Song Pan, Yichang (CN); Lei Wu, Yichang (CN); Huanian Yang, Yichang (CN); Ming Zhang, Yichang (CN)

(73) Assignee: YICHANG JINGWEI TEXTILE MACHINERY CO., LTD.

( * ) Notice: Subject to any disclaimer, the term of this patent is extended or adjusted under 35 U.S.C. 154(b) by 92 days.

(21) Appl. No.: 16/584,548

(22) Filed: Sep. 26, 2019

(65) Prior Publication Data

US 2020/0024100 A1    Jan. 23, 2020

(30) Foreign Application Priority Data

Aug. 2, 2019    (CN) .......................... 201910712746.8

(51) Int. Cl.
*G01V 8/12* (2006.01)
*B65H 63/032* (2006.01)
*B65H 63/08* (2006.01)
*D01H 7/18* (2006.01)

(52) U.S. Cl.
CPC ....... *B65H 63/0324* (2013.01); *B65H 63/082* (2013.01); *D01H 7/18* (2013.01); *G01V 8/12* (2013.01)

(58) Field of Classification Search
CPC .... B65H 63/0324; B65H 63/082; D01H 7/18; G01V 8/12
See application file for complete search history.

(56) References Cited

U.S. PATENT DOCUMENTS

2017/0217717 A1 * 8/2017 Hiepp .................. B65H 63/082

* cited by examiner

*Primary Examiner* — Kevin K Pyo

(57) ABSTRACT

A device and a method for detecting a distance from a balloon to an ingot tank is provided. The device comprises a set of photoelectric transmitting tube and photoelectric receiving tube which are arranged in a height range of a balloon, Wherein a light beam between the photoelectric transmitting tube and the photoelectric receiving tube is arranged to be tangent to an appropriate balloon, and is used for detecting whether the balloon is located at an appropriate position according to a number of pulses received by the photoelectric receiving tube in one period of rotation of the balloon.

13 Claims, 7 Drawing Sheets

DEVICE AND METHOD FOR DETECTING DISTANCE FROM BALLOON TO INGOT TANK

FIELD

The present invention relates to the field of twisters, and more particularly, to a device and a method for detecting a distance from a balloon to an ingot tank.

BACKGROUND

A yarn of a twister is driven by a twisting assembly rotate outside an ingot tank at 4000 r/min to 12000 r/min to form a balloon, a size of the balloon has great influence on energy consumption and the quality of finished products, an excessive diameter of the balloon causes sharp increase of the energy consumption of the twister, the increase of the energy consumption can reach 30%, and the excessive balloon may touch a wall plate or a yarn separating plate and the like, resulting in increased yarn strength loss and even yarn breakage; and excessively small balloon can cause the friction between the yarn and the ingot pot, resulting in fuzziness and yarn breakage, so as to affect the quality of finished products and a full ingot rate of equipment. Maintaining a stable shape of the balloon is a necessary condition to ensure the normal production of a twister.

A solution exists in the prior art that a sensor is used to detect a diameter of a yarn balloon.

For example, the German patent document DE1.02015014382 describes that a device for detecting a measured value i is a sensor device 25, which is configured as a grating, comprising a light source 26 and a light receiver 27. The optically operated grating is shielded by a looped yarn of a yarn balloon 13, and in an exemplary embodiment, an outer yarn 5 originating from a first feeding bobbin 7 intermittently shields a light beam 28 during each rotation of the yarn balloon B, which can infer an instantaneous rotational speed of a spindle 2 and a size of the yarn balloon B. How to determine the size of the yarn balloon B is not given in the document. The German patent document DE102016001099 describes that a sensing device 33 can be configured as single channel-grating, wherein the light source 41 and the light receiver 40 are arranged on mutually opposite sides of the yarn balloon B to be monitored, or configured as reflection-grating, wherein the light source 41 and the light receiver 40 are arranged on the same side of the yarn balloon to be monitored, and are arranged in a common sensor housing. Therefore, a measured beam 42 of the sensing device 33 is intersected twice by the yarn during each surrounding of the yarn balloon B. An adjusting circuit 18 calculates a diameter of current yarn balloon B without any problem based on an time interval t between two measured pulses i and a known distance from the measured beam 42 to a rotation axis 35 of the spindle 2. According to the solution, the accuracy requirements on the sensing device 33 and the adjusting circuit 18 are very high, taking a rotation speed of the yarn balloon of 10000 r/min as an example, a time for the yarn to rotate for one cycle is about 6 ins, according to the difference of PLC user program execution, a time for PLC refresh is about 1 ms to 100 ms, a time difference of 0.5 ms to 2 ms between two pulses needs to be detected within a time range of 6 ms for one cycle, the accuracy requirements on the sensing device 33 and the adjusting circuit 18 are higher, the anti-interference capability requirements on the equipment are also extremely high, resulting in higher equipment costs and weaker anti-interference capability.

SUMMARY

The technical problem to be solved by the present invention is to provide a device and a method for detecting a distance from a balloon to an ingot tank, so that a distance from a balloon to an ingot tank can be detected with lower costs and stronger anti-interference capability, thus ensuring a stable shape of the balloon. In addition, according to the appropriate distance from the balloon to the ingot tank obtained by the detection device and the method, a reasonable space position required for the normal operation of each ingot position can be determined, thus avoiding touching the ingot tank because of excessively small distance from the balloon to the ingot tank, and avoiding touching a wall plate or a yarn separating plate because of excessively large distance from the balloon to the ingot tank.

In order to solve the technical problem above, the technical solution used in the present invention is that: a device for detecting a distance from a balloon to an ingot tank comprises a set of photoelectric transmitting tube and photoelectric receiving tube which are arranged in a height range of a balloon, wherein a light beam between the photoelectric transmitting tube and the photoelectric receiving tube is arranged to be tangent to an appropriate balloon, and is used for detecting whether the balloon is located at an appropriate position according to a number of pulses received by the photoelectric receiving tube in one period of rotation of the balloon.

In a preferred solution, a light source of the photoelectric transmitting tube is visible light, infrared light or laser.

In a preferred solution, the light beam is located in a region between a bottom of a twister and a bottom of an ingot tank.

In a preferred solution, the photoelectric transmitting tube and the photoelectric receiving tube are electrically connected with an acquisition device, and the acquisition device is used for acquiring the number of pulses received by the photoelectric receiving tube in one period of rotation of the balloon.

In a preferred solution, the photoelectric transmitting tube and the photoelectric receiving tube are fixedly connected with an installation base respectively, and the installation bases are fixedly connected through a connecting rod to limit a relative position between the photoelectric transmitting tube and the photoelectric receiving tube.

In a preferred solution, the installation base is connected with a bracket base in a position-adjustable manner. The position-adjustable manner comprises: connecting two installation bases with a second sliding rail or a first sliding rail on the bracket base in adjustable up, down, front and rear manners; or connecting one of the two installation bases with the bracket base through a pin shaft, and connecting the other installation base with a sliding groove on the bracket base through a fixing screw in an adjustable manner.

In a preferred solution, the installation base is connected with a bracket base in a position-adjustable manner. The position-adjustable manner comprises: slidably connecting two installation bases with the bracket base through a first sliding rail, further arranging a rotatable screw rod along the first sliding rail, connecting the screw rod with the installation base in a threaded manner, and connecting one end of the screw rod with a motor; or connecting one of the two installation bases with the bracket base through a pin shaft, slidably connecting the other installation base with the bracket base through the first sliding rail, further arranging the rotatable screw rod along the first sliding rail, connecting the screw rod with the installation base in a threaded manner, and connecting one end of the screw rod with the motor.

In a preferred solution, the installation base is provided with scales for determining an installation position of the installation base; and a silk thread parallel to the light beam is arranged on a vertical surface coincident with the light beam for determining a specific position of the light beam.

A method for using the above device for detecting a distance from a balloon to an ingot tank comprises the following step of: counting, by the balloon formed by a spindle assembly driving a yarn to rotate, the pulses received by the photoelectric receiving tube within a range of one period of rotation, if the number is 1, judging a distance from the balloon to the ingot tank to be appropriate, if the number is 2, judging the distance from the balloon to the ingot tank to be too large; and if the number is zero, judging the distance from the balloon to the ingot tank to be too small, thus realizing rapid detection of the distance from the balloon to the ingot tank.

In a preferred solution, when the number is 2, a tension adjusting device increases a tension on the yarn; when the number is 1, the tension adjusting device maintains the existing tension; and when the number is 0, the tension adjusting device reduces the tension on the yarn, after a period of time, if the number is still 0, the yarn is determined to be broken, and if the number is increased to 1, the tension adjusting device maintains the existing tension.

The present invention provides a device and a method for detecting a distance from a balloon to an ingot tank. By using a set of photoelectric transmitting tube and photoelectric receiving tube with correlative light beam located at a position appropriately tangent to the balloon, whether the balloon is located at the appropriate position can be detected by counting, so that the position of the balloon, especially the distance from the balloon to the ingot tank can be accurately detected by the photoelectric transmitting tube with lower accuracy, the photoelectric receiving tube and the acquisition circuit. Compared with the detection method of time difference, the detection method of counting has a higher robustness. In the preferred solution, the connecting rod is arranged to fix the relative position between the photoelectric transmitting tube and the photoelectric receiving tube, so as to ensure the relative position between the photoelectric transmitting tube and the photoelectric receiving tube before installation and ensure the installation accuracy, and only the light beam needs to be ensured to be tangent to the appropriate balloon during assembly installation. The installation mode capable of adjusting the position of the installation base is used to facilitate position adjustment during installation, and facilitate adjustment according to the sizes of different yarns corresponding to different balloons, so that the production of different products is very convenient, and the solution of controlling the position of the installation base by using the motor can realize automatic adjustment according to a variety of the yarn and an outer diameter of the ingot tank, thus further improving an automation degree of equipment. The method of the present invention is simple and convenient to control, does not ask for high accuracy of components, and has obvious economic benefits. The installation position of the present invention can be selected in a wide range, and can be in the region between the bottom of the twister and the bottom of the ingot tank.

BRIEF DESCRIPTION OF THE DRAWINGS

The present invention is further described below with reference to the drawings and the embodiments.

Figure 1:
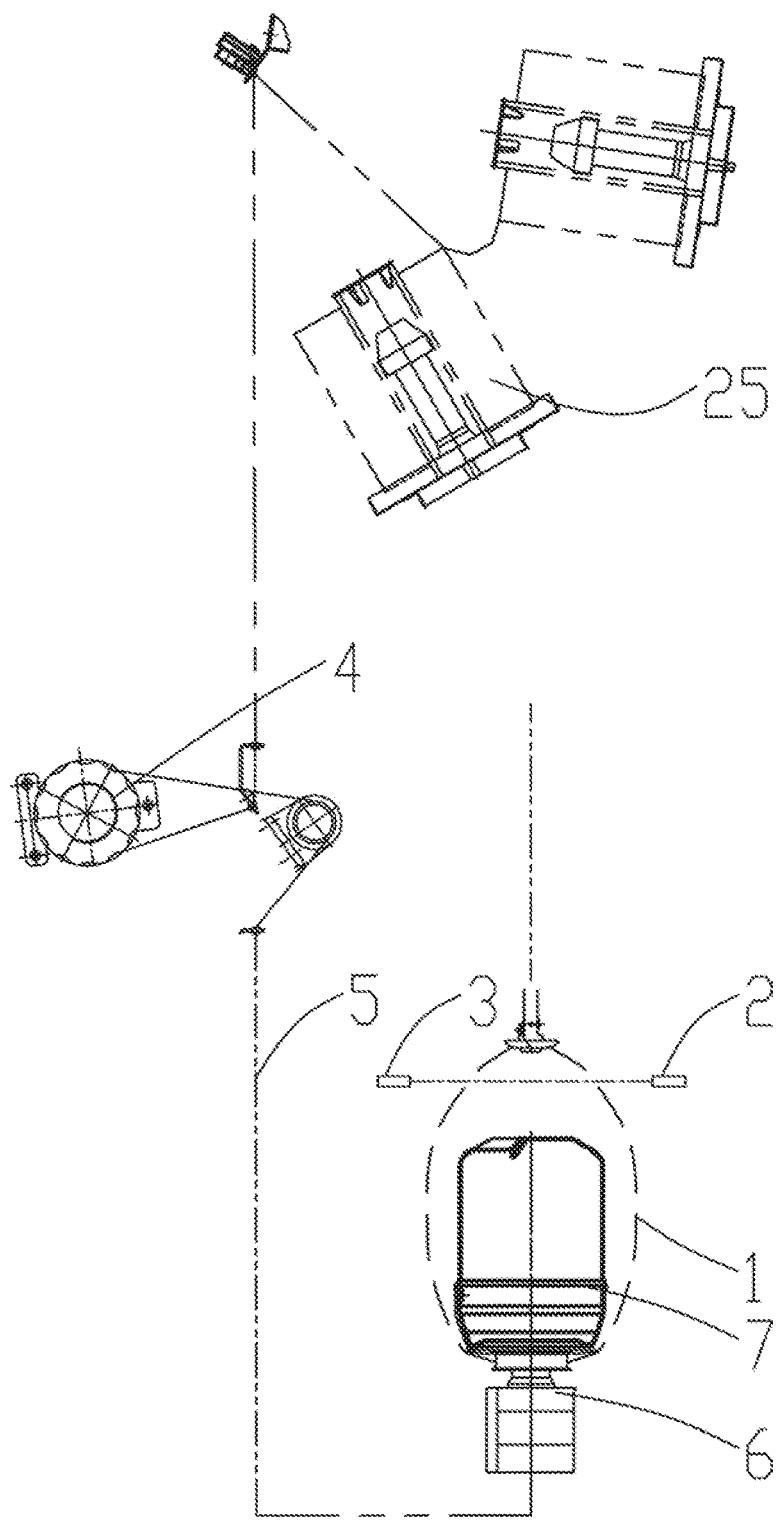
FIG. 1 is an overall structure diagram of a device for detecting a distance from a balloon to an ingot tank in the present invention.

In the drawings: 1 refers to balloon, 2 refers to photoelectric transmitting tube, 3 refers to photoelectric receiving tube, 4 refers to tension adjusting device, 5 refers to yarn, 6 refers to twisting assembly, 7 refers to ingot tank, 8 refers to light beam, 9 refers to twister, 10 refers to acquisition device, 11 refers to excessively large balloon, 12 refers to appropriate balloon, 13 refers to excessively small balloon, 14 refers to connecting rod, 15 refers to fixing screw, 16 refers to installation base, 17 refers to sliding groove, 18 refers to bracket base, 19 refers to motor, 20 refers to bearing pedestal, 21 refers to screw rod, 22 refers to first sliding rail, 23 refers to pulse, 24 refers to second sliding rail, 25 refers to package and 26 refers to pin shaft.

DETAILED DESCRIPTION

Embodiment 1

As shown in FIGS. 1 to 7, in a device for detecting a distance from a balloon to an ingot tank, a spindle assembly 6 drives a yarn 5 to rotate to form a balloon 1, and a tension adjusting device 4 is arranged on a path of the yarn 5 to adjust a tension of the yarn 5; the device comprises a set of photoelectric transmitting tube 2 and photoelectric receiving tube 3 which are arranged in a height range of a balloon 1, and a light beam 8 between the photoelectric transmitting tube 2 and the photoelectric receiving tube 3 is arranged to be tangent to an appropriate balloon 12, and is used for detecting whether the balloon 1 is located at an appropriate position according to a number of pulses received by the photoelectric receiving tube 3 in one period of rotation of the balloon 1. According to the solution, whether the balloon 1 is located at the appropriate position can be judged by a number of times the light beam 8 is cut off, thus reducing the accuracy requirements on equipment. Especially in complex working conditions of factories, dust, vibration, circuit disturbance and other reasons can affect the accuracy of the photoelectric transmitting tube 2 and the photoelectric receiving tube 3, and the solution of detecting the number of pulses can reduce the accuracy requirements.

In a preferred solution, a light source of the photoelectric transmitting tube 2 is visible light, infrared light or laser.

Figure 2:
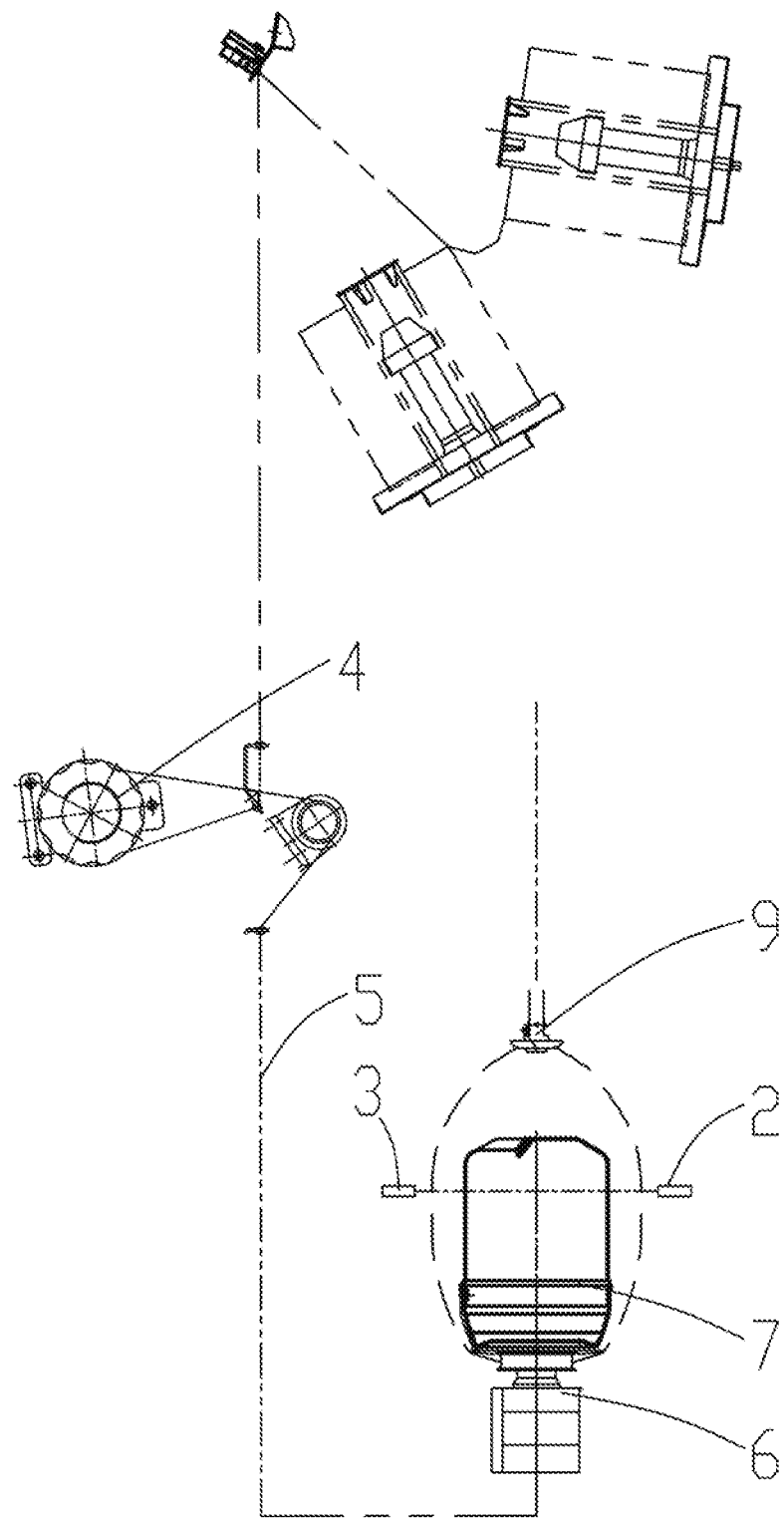
FIG. 2 is an overall structure diagram of another preferred device for detecting a distance from a balloon to an ingot tank in the present invention.
Figure 3:
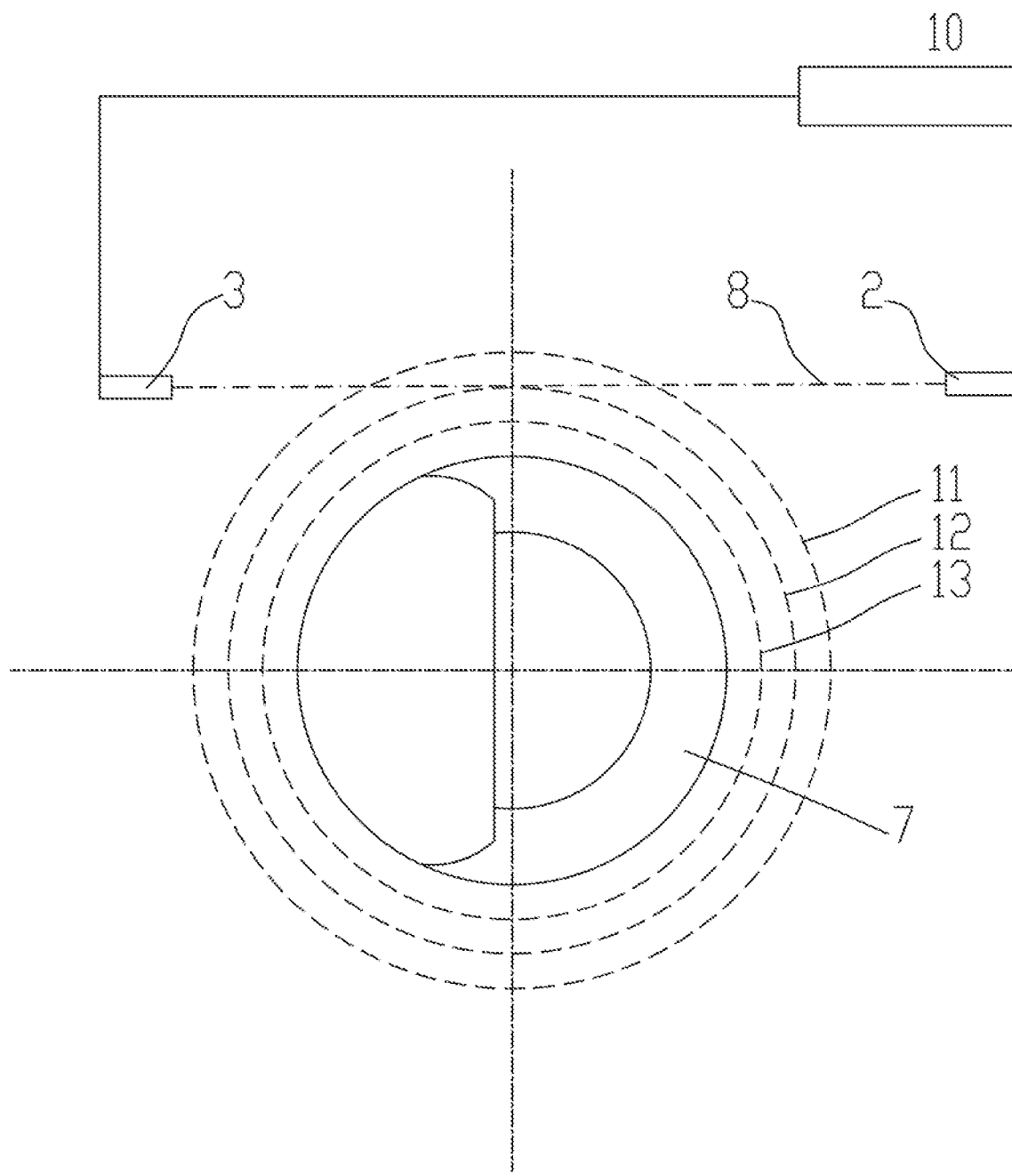
FIG. 3 is a top view of a structure of relative installation positions of a photoelectric transmitting tube and a photoelectric receiving tube as well as a balloon in the present invention.

In a preferred solution shown in FIGS. 1 and 2, the light beam 8 is located in a region between a bottom of a twister 9 and a bottom of an ingot tank 7. The solution of the present invention is used for detecting the number of pulses, does not have high requirements on installation position, and can acquire a clearer pulse signal by arranging between a top and a bottom of the ingot tank 7.

In a preferred solution, the photoelectric transmitting tube 2 and the photoelectric receiving tube 3 are electrically connected with an acquisition device 10, and the acquisition device 10 is used for acquiring the number of pulses received by the photoelectric receiving tube 3 in one period of rotation of the balloon 1. After amplifying and filtering a pulse signal of the photoelectric receiving tube 3 acquired by the acquisition device 10, many chips capable of receiving the number of pulses are arranged, such as 51 series, stm32 series and other single chips, with relatively low price.

Figure 5:
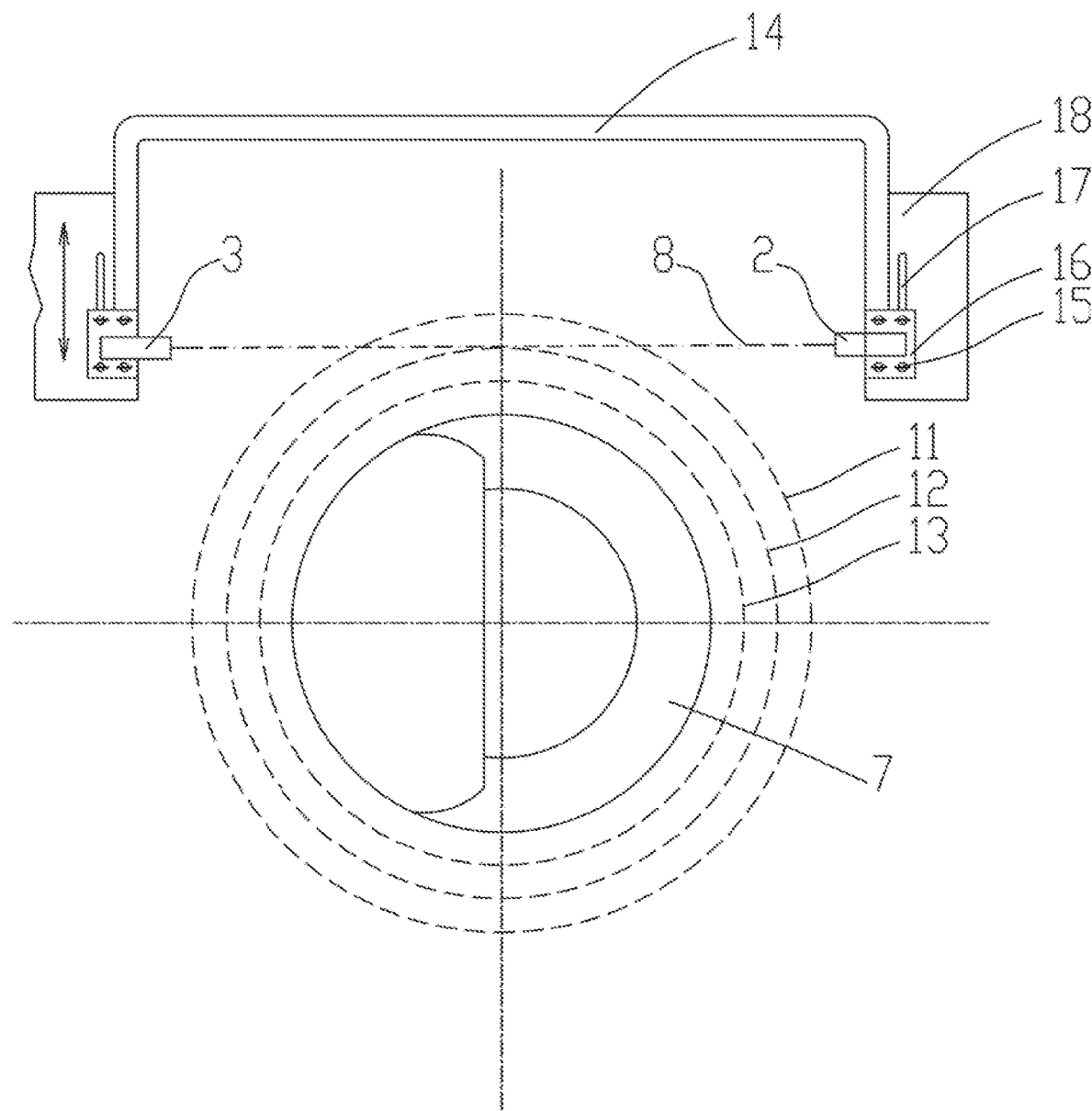
FIG. 5 is an overall structure diagram of another preferred device for detecting a distance from a balloon to an ingot tank in the present invention.
Figure 7:
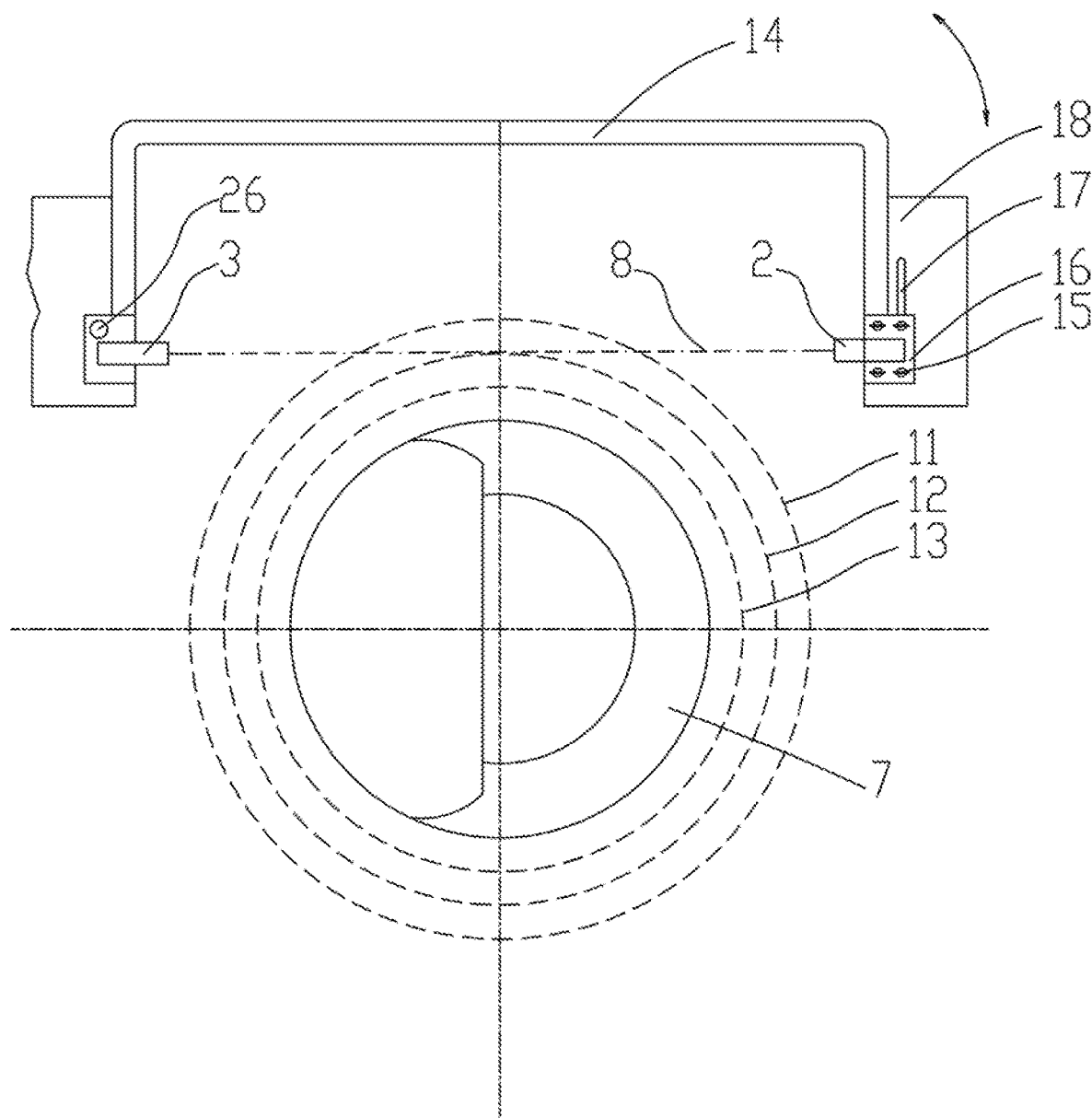
FIG. 7 is an overall structure diagram of another preferred device for detecting a distance from a balloon to an ingot tank in the present invention.

In a preferred solution shown in FIGS. 5 and 7, the photoelectric transmitting tube 2 and the photoelectric receiving tube 3 are fixedly connected with an installation base 16 respectively, and the installation bases 16 are fixedly connected through a connecting rod 14 to limit a relative position between the photoelectric transmitting tube 2 and the photoelectric receiving tube 3. The structure facilitates installation and debugging. An assembly installation and debugging time is greatly reduced.

In a preferred solution shown in FIGS. 5 and 7, the installation base 16 is connected with a bracket base 18 in a position-adjustable manner; and the bracket base 18 in the embodiment is a structure fixedly connected with a bracket of a twister.

The position-adjustable manner comprises that: two installation bases 16 are connected with a second sliding rail 24 or a first sliding rail 22 on the bracket base 18 in adjustable up, down, front and rear manners, wherein the first sliding rail 22 is arranged substantially horizontally to adjust front and rear positions of the two installation bases 16. The second sliding rail 24 is arranged substantially vertically to adjust upper and lower positions of the two installation bases 16.

As shown in FIG. 5, the two installation bases 16 are connected with a sliding groove 17 on the bracket base 18 through a fixing screw 15 in an adjustable manner; and the solution is to adjust the position back and forth. The solution of up and down adjustment is not shown in the drawing, since a shape of the balloon 1 is generally oval from top to bottom, after the two installation bases 16 are adjusted up and down, a position of the light beam 8 can be tangent to the appropriate balloon 12 and can adapt to the balloons 1 of different sizes.

Alternatively, in FIG. 7, one of the two installation bases 16 is connected with the bracket base 18 through a pin shaft 26, and the other installation base 16 is connected with a sliding groove on the bracket base 18 through a fixing screw 15 in an adjustable manner. The solution is to adjust a tangent position by rotation.

Figure 6:
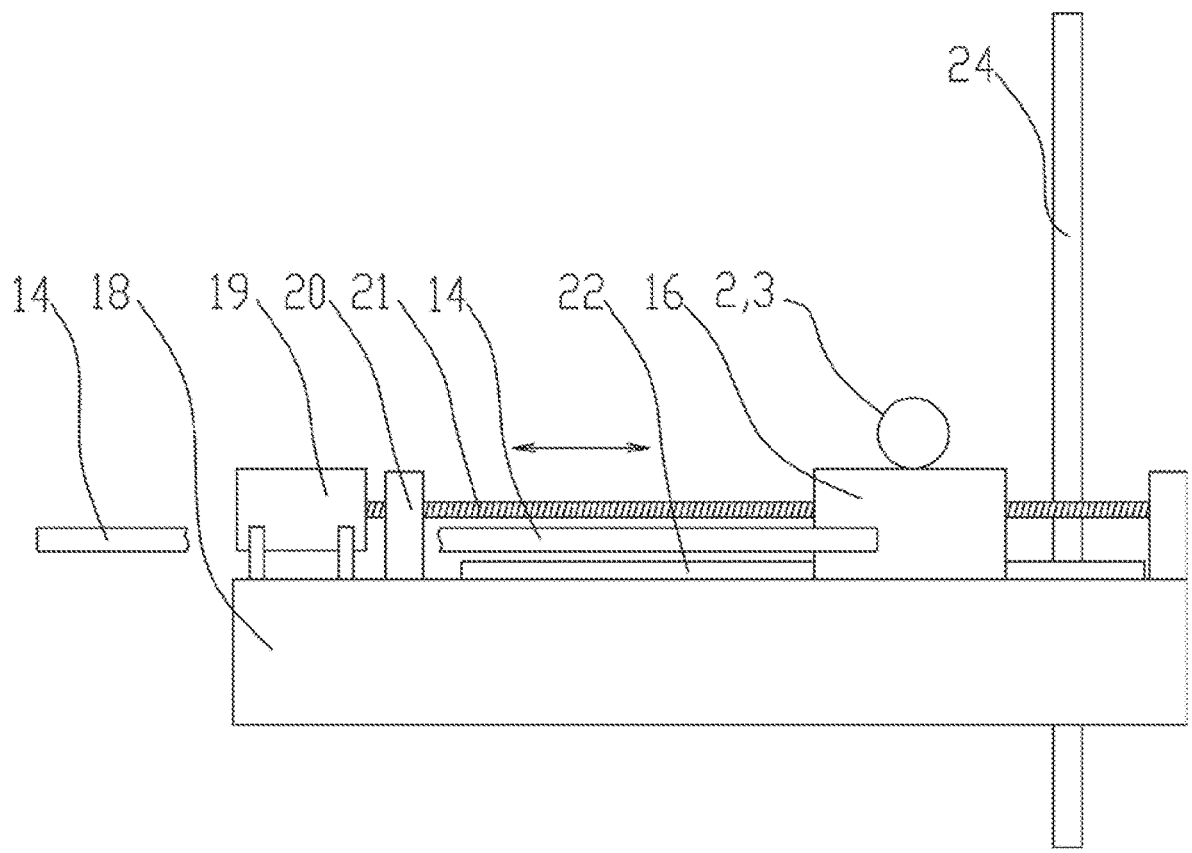
FIG. 6 is an installation structure diagram of the preferred device for detecting a distance from a balloon to an ingot tank in the present invention.

In another preferred solution shown in FIG. 6, the installation base 16 is connected with a bracket base 18 in a position-adjustable manner; the position-adjustable manner comprises that: according to a combination shown in FIGS. 5 and 6, two installation bases 16 are slidably connected with the bracket base 18 through a first sliding rail 22, a rotatable screw rod 21 is further arranged along the first sliding rail the screw rod 21 is connected with the installation base 16 in a threaded manner, and one end of the screw rod 21 is connected with a motor 19; and the solution realizes automatic front and rear adjustment of overall position.

Alternatively, according to a combination shown in FIGS. 6 and 7, one of the two installation bases 16 is connected with the bracket base 18 through a pin shaft, the other installation base 16 is slidably connected with the bracket base 18 through the first sliding rail 22, the rotatable screw rod 21 is further arranged along the first sliding rail 22, the screw rod 21 is connected with the installation base 16 in a threaded manner, and one end of the screw rod 21 is connected with the motor 19. The solution is to automatically adjust the tangent position by rotation.

In a preferred solution, the installation base 16 is provided with scales for determining an installation position of the installation base 16; and a silk thread parallel to the light beam 8 is arranged on a vertical surface coincident with the light beam 8 for determining a specific position of the light beam. Since partial light beam 8 is invisible to naked eyes, debugging is more troublesome, and the arranged silk thread can conveniently determine the position tangent to the balloon 1.

Embodiment 2

Figure 4:
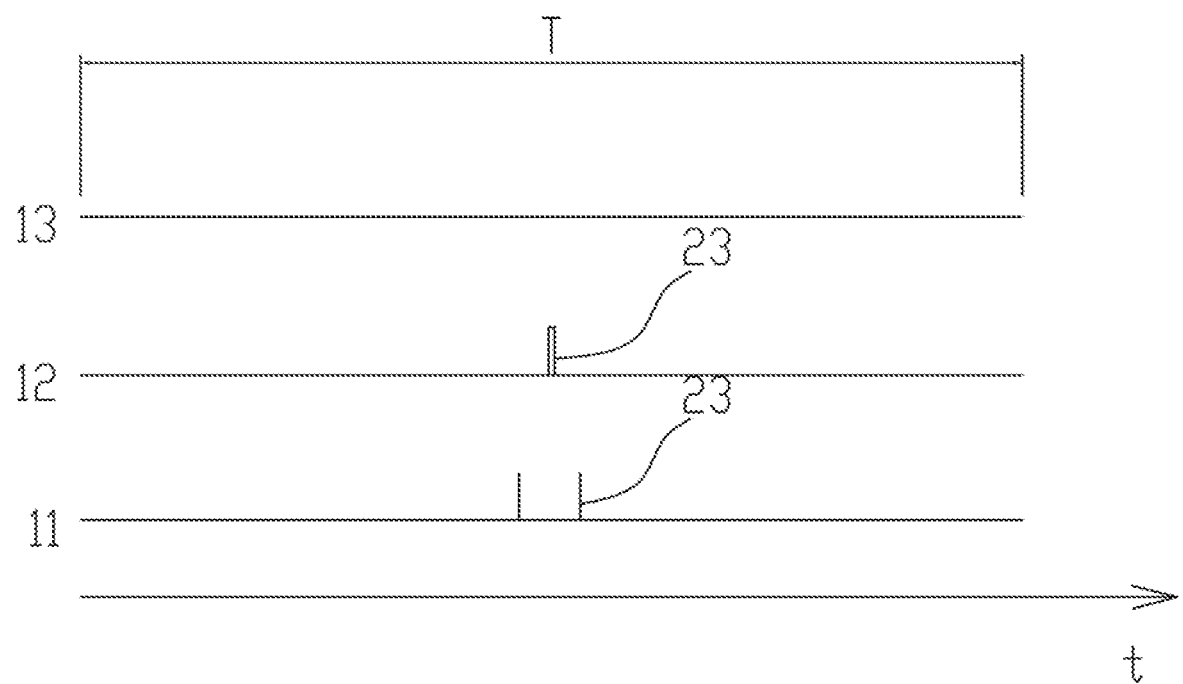
FIG. 4 is a signal diagram of a number of pulses corresponding to different distances from a balloon to an ingot tank within one period of rotation of a yarn acquired by an acquisition device in the present invention.

A method for using the above device for detecting a distance from a balloon to an ingot tank comprises the following step of: counting, by the balloon 1 formed by a twisting assembly 6 driving a yarn 5 to rotate, the pulses received by the photoelectric receiving tube within a range of one period of rotation, if the number is 1, judging a distance from the balloon 1 to the ingot tank to be appropriate, if the number is 2, judging the distance from the balloon 1 to the ingot tank to be too large; and if the number is zero, judging the distance from the balloon 1 to the ingot tank to be too small, thus realizing rapid detection of the distance from the balloon to the ingot tank. As shown in FIG. 4, the balloon 1 can be accurately controlled to be located at an appropriate position by detecting the number of pulses.

In a preferred solution, when the number is 2, a tension adjusting device 4 increases a tension on the yarn 5; when the number is 1, the tension adjusting device 4 maintains the existing tension; and when the number is 0, the tension adjusting device 4 reduces the tension on the yarn 5, after a period of time, if the number is still 0, the yarn is determined to be broken, and if the number is increased to 1, the tension adjusting device 4 maintains the existing tension.

In a control process, a PID adjusting mode is used in the tension adjusting device 4, and in a state of excessively large balloon 11 at the beginning, when a width between two pulses detected is larger, an adjusting rate is higher; when a width between the two pulses detected is smaller, the adjustment rate is lower; and until one pulse is reached, automatically controlled adjustment is completed.

The embodiments above are only preferred technical solutions of the invention and shall not be regarded as limiting the invention, and the protection scope of the invention shall subject to the technical solutions described in the claims, including the equivalent substitutions of technical features in the technical solutions described in the claims. That is, the equivalent substitution improvements within the scope are also included in the protection scope of the invention.

What is claimed is:

1. A device for detecting a distance from a balloon to an ingot tank, comprising a set of photoelectric transmitting tube (2) and photoelectric receiving tube (3) which are arranged in a height range of a balloon (1), wherein
a light beam (8) between the photoelectric transmitting tube (2) and the photoelectric receiving tube (3) is arranged to be tangent to an appropriate balloon (12), and is used for detecting whether the balloon (1) is located at an appropriate position according to a number of pulses (23) received by the photoelectric receiving tube (3) in one period of rotation of the balloon (1),
the photoelectric transmitting tube (2) and the photoelectric receiving tube (3) are fixedly connected with an installation base (16) respectively, and the installation bases (16) are fixedly connected through a connecting rod (14) to limit a relative position between the photoelectric transmitting tube (2) and the photoelectric receiving tube (3).

2. The device for detecting a distance from a balloon to an ingot tank according to claim 1, wherein,
a light source of the photoelectric transmitting tube (2) is visible light, infrared light or laser.

3. The device for detecting a distance from a balloon to an ingot tank according to claim 1, wherein,
the light beam (8) is located in a region between a bottom of a twister (9) and a bottom of an ingot tank (7).

4. The device for detecting a distance from a balloon to an ingot tank according to claim 1, wherein,
the photoelectric transmitting tube (2) and the photoelectric receiving tube (3) are electrically connected with an acquisition device (10), and the acquisition device (10) is used for acquiring the number of pulses received by the photoelectric receiving tube (3) in one period of rotation of the balloon (1).

5. The device for detecting a distance from a balloon to an ingot tank according to claim 1, wherein,
the installation base (16) is connected with a bracket base (18) in a position-adjustable manner, wherein,
two installation bases (16) are connected with a second sliding rail (24) or a first sliding rail (22) on the bracket base (18) in adjustable up, down, front and rear manners;
or one of the two installation bases (16) is connected with the bracket base (18) through a pin shaft (26), and the other installation base (16) is connected with a sliding groove (17) on the bracket base (18) through a fixing screw (15) in an adjustable manner.

6. The device for detecting a distance from a balloon to an ingot tank according to claim 1, wherein,
the installation base (16) is connected with a bracket base (18) in a position-adjustable manner, wherein,
two installation bases (16) is slidably connected with the bracket base (18) through a first sliding rail (22), a rotatable screw rod (21) is further arranged along the first sliding rail (22), the screw rod (21) is connected with the installation base (16) in a threaded manner, and one end of the screw rod (21) is connected with a motor (19);
or one of the two installation bases (16) is connected with the bracket base (18) through a pin shaft, the other installation base (16) is slidably connected with the bracket base (18) through the first sliding rail (22), the rotatable screw rod (21) is further arranged along the first sliding rail (22), the screw rod (21) is connected with the installation base (16) in a threaded manner, and one end of the screw rod (21) is connected with a motor (19).

7. The device for detecting a distance from a balloon to an ingot tank according to claim 1, wherein,
the installation base (16) is provided with scales for determining an installation position of the installation base (16); and
a silk thread parallel to the light beam (8) is arranged on a vertical surface coincident with the light beam (8) for determining a specific position of the light beam.

8. The device for detecting a distance from a balloon to an ingot tank according to claim 5, wherein,
the installation base (16) is provided with scales for determining an installation position of the installation base (16); and
a silk thread parallel to the light beam (8) is arranged on a vertical surface coincident with the light beam (8) for determining a specific position of the light beam.

9. The device for detecting a distance from a balloon to an ingot tank according to claim 6, wherein,
the installation base (16) is provided with scales for determining an installation position of the installation base (16); and
a silk thread parallel to the light beam (8) is arranged on a vertical surface coincident with the light beam (8) for determining a specific position of the light beam.

10. A method for using the device for detecting a distance from a balloon to an ingot tank according to claim 1, comprising the following step of:
counting, by the balloon (1) formed by a twisting assembly (6) driving a yarn (5) to rotate, the pulses received by the photoelectric receiving tube (3) within a range of one period of rotation,
if the number is 1, judging a distance from the balloon (1) to the ingot tank to be appropriate,
if the number is 2, judging the distance from the balloon (1) to the ingot tank to be too large; and
if the number is zero, judging the distance from the balloon to the ingot tank to be too small, thus realizing rapid detection of the distance from the balloon to the ingot tank.

11. The method for using the device for detecting a distance from a balloon to an ingot tank according to claim 10, wherein,
when the number is 2, a tension adjusting device (4) increases a tension on the yarn (5);
when the number is 1, the tension adjusting device (4) maintains existing tension; and
when the number is 0, the tension adjusting device (4) reduces the tension on the yarn (5), after a period of time, if the number is still 0, the yarn is determined to be broken, and if the number is increased to 1, the tension adjusting device (4) maintains the existing tension.

12. A method for using the device for detecting a distance from a balloon to an ingot tank according to claim 7, comprising the following step of:
counting, by the balloon (1) formed by a twisting assembly (6) driving a yarn (5) to rotate, the pulses received by the photoelectric receiving tube (3) within a range of one period of rotation,
if the number is 1, judging a distance from the balloon (1) to the ingot tank to be appropriate,
if the number is 2, judging the distance from the balloon (1) to the ingot tank to be too large; and
if the number is zero, judging the distance from the balloon to the ingot tank to be too small, thus realizing rapid detection of the distance from the balloon to the ingot tank.

13. The method for using the device for detecting a distance from a balloon to an ingot tank according to claim 12, wherein,
- when the number is 2, a tension adjusting device (4) increases a tension on the yarn (5);
- when the number is 1, the tension adjusting device (4) maintains existing tension; and
- when the number is 0, the tension adjusting device (4) reduces the tension on the yarn (5), after a period of time, if the number is still 0, the yarn is determined to be broken, and if the number is increased to 1, the tension adjusting device (4) maintains the existing tension.

* * * * *